M. L. SCHLUETER.
TRACTOR ATTACHMENT FOR AUTOMOBILES.
APPLICATION FILED MAR. 24, 1920.

1,411,523.

Patented Apr. 4, 1922.

Witness:
Stephen J. Rebora.

Inventor:
Max L. Schlueter
by Chamberlin & Breudenreich
Atty's.

M. L. SCHLUETER.
TRACTOR ATTACHMENT FOR AUTOMOBILES.
APPLICATION FILED MAR. 24, 1920.
1,411,523.
Patented Apr. 4, 1922.
2 SHEETS—SHEET 2.
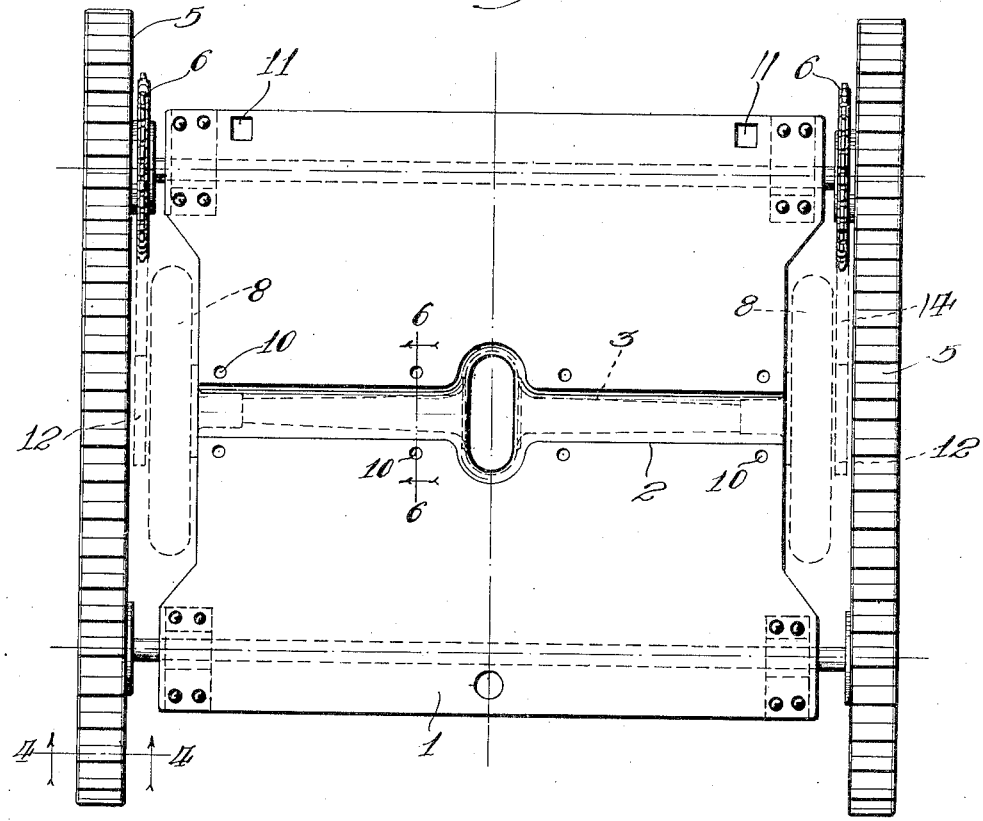
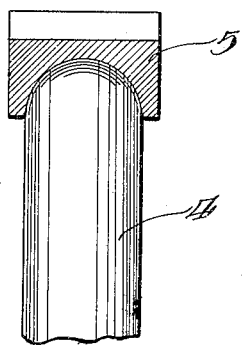
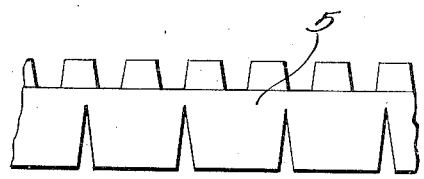
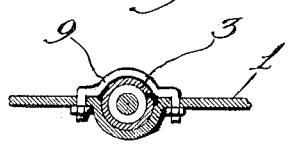

UNITED STATES PATENT OFFICE.

MAX L. SCHLUETER, OF CHICAGO, ILLINOIS.

TRACTOR ATTACHMENT FOR AUTOMOBILES.

1,411,523. Specification of Letters Patent. Patented Apr. 4, 1922.

Application filed March 24, 1920. Serial No. 368,261.

*To all whom it may concern:*

Be it known that I, MAX L. SCHLUETER, a citizen of the United States, residing at Chicago, county of Cook, State of Illinois, have invented a certain new and useful Improvement in Tractor Attachments for Automobiles, and declare the following to be a full, clear, and exact description of the same, such as will enable others skilled in the art to which it pertains to make and use the same, reference being had to the accompanying drawings, which form a part of this specification.

My invention has for its object to produce a simple and novel device which may be placed underneath an automobile and, without dismantling or altering the latter, transform the automobile into a tractor driven from the automobile power plant.

In carrying out my invention I employ a low fourwheeled truck which is placed preferably under the driving axle of an automobile and is driven from the driving wheels; endless tracks or belts being passed over the wheels on each side of the truck to provide a large tread surface. This truck, in addition to its tractor properties, serves also to reduce the jolting effect in travelling over rough roads, by reason of the fact that the automobile runs on six instead of only four wheels when the tractor device is in use. Therefore, where rough roads are to be traversed, if the wheels of the tractor are properly selected, the user may take off the endlesss tracks or belts and use the tractor device simply as a means for producing smooth running over the rough roads.

In one of its aspects, therefore, my invention may be regarded as an attachment for automobiles adapted to make them run more smoothly over rough roads than they would without the attachment.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Fig. 3 is a top plan view of the tractor device on the same scale as Fig. 2, the rear axle and wheels of the automobile being shown in dotted lines;

Fig. 4 is a section taken approximately on line 4—4 of Fig. 3, on an enlarged scale;

Fig. 5 is a side view of a fragment of the flexible track or belt; and

Fig. 6 is a section taken on line 6—6 of Fig. 3, the axle being shown in full lines.

Figure 1:
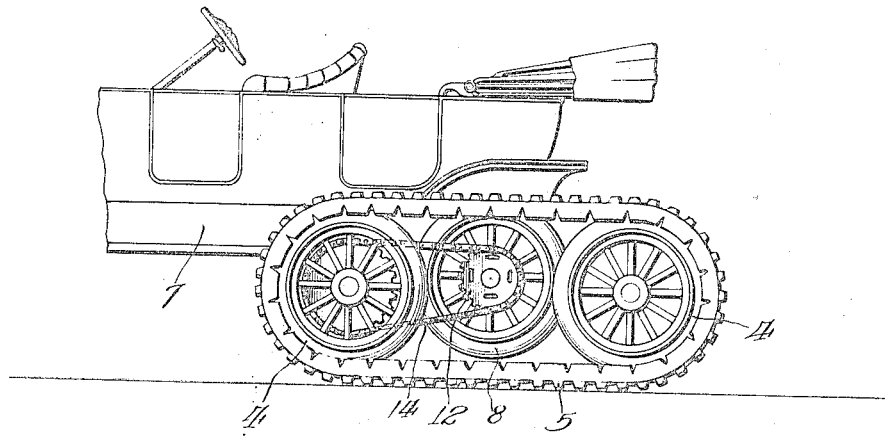
Figure 1 is a side view of the rear end of an automobile mounted on my improved tractor device.
Figure 2:
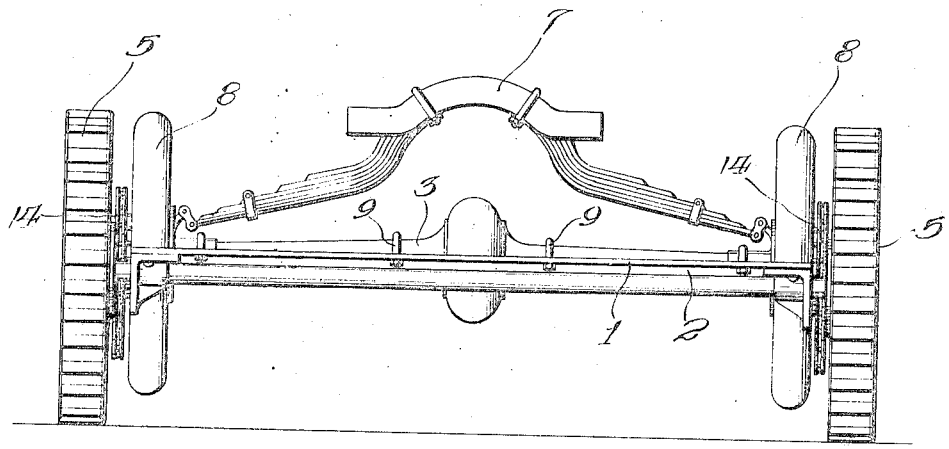
Fig. 2 is a rear view, on an enlarged scale, of the tractor device showing the rear wheels and axle of the automobile in place.

Referring to the drawings, 1 represents a suitable platform or frame having a groove or seat, 2, extending across the same at about the middle; this groove or seat being shaped to receive the rear axle, 3, of the automobile to which the traction device is to be applied. The frame is supported at its four corners upon suitable wheels, 4, which may take any desired form and, if desired, be ordinary automobile wheels with pneumatic tires. A flexible track or belt, 5, extends around the two wheels on each side of the device. The under side of the track or belt may be shaped to fit the contour of the tread surfaces of the wheels in order to prevent relative lateral displacement. Each of the two forward wheels is provided with a sprocket wheel, 6, attached thereto.

In using the device, the rear end of the automobile, indicated as a whole at 7, is lifted, the traction device is placed underneath the same so as to bring the rear axle just above the groove or seat, 2. The automobile is then lowered until its axle rests in the seat and its rear wheels, 8, lie between the endless tracks and the sides of the frame or platform. The traction device and the automobile may then be fastened together in any suitable way as, for example, by means of a number of U bolts 9, passing over the axle and downwardly through openings, 10, in the frame of platform. If desired, arms or posts, not shown, may be rigidly fastened to the frame of the automobile and project downwardly into interlocking relation with some part of the frame as, for example, by entering holes, 11, in the frame near the front end of the latter. Such additional holding means will serve to relieve the driving axle of twisting strains in turning curves.

After the rear end of the automobile has been secured on the tractor device, sprocket wheels, 12, are attached to the rear wheels of the automobile; the parts being so proportioned that each of the sprocket wheels, 6, will lie in the same vertical plane at right angles to the axles as the corresponding sprocket wheel, 12. A sprocket chain, 14, is then passed over each pair of sprocket wheels 6 and 12, and the transformation of the simple automobile into a caterpillar tractor is complete. The sprocket wheels, 12, may be smaller than the sprocket wheels on the tractor device so as to effect a speed reduction and permit the automobile to operate at a lower speed as a tractor than when running as a simple automobile.

The parts are of course so proportioned that the rear wheels of the automobile are held raised out of contact with the surface over which the tractor device travels.

It will thus be seen that I have produced a simple and novel device which may quickly and easily be applied to an automobile to transform the latter into an efficient tractor and which may just as easily and conveniently again be disconnected therefrom so as again to convert the automobile into a simple automobile.

It will also be seen that when the tractor device is in use the rear end of the automobile is supported on four wheels instead of only two; so that when either the front or rear wheels of the tractor device strike a projection in the the road or drop into a depression the vertical movement of the rear end of the automobile produced thereby is only one-half as great as in the case where the automobile is running on its own wheels, the tractor device, as a whole, rocking on the rear axle. Consequently it may often be found to be of advantage to use the tractor, with its endless tracks removed, simply for the purpose of securing easy riding qualities over rough roads, particularly where the wheels of the tractor device are ordinary pneumatic-tired automobile wheels.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A device for converting an automobile into a tractor, comprising a frame, two supporting wheels on each side of the frame, said supporting wheels being provided with pneumatic tires, an endless track passing around the two wheels on each side of the frame, said frame having a transverse seat for receiving the rear axle of an automobile, and having openings at the ends of said seat to permit the driving wheels of an automobile resting on said device to project downwardly beside said tracks, one of the wheels on each side having on the inner side thereof a sprocket wheel arranged in a vertical plane close to that containing the corresponding driving wheel of the automobile when the latter is resting on said frame.

2. A device for converting an automobile into a tractor, comprising an approximately square platform having supporting wheels at the four corners thereof, an endless track passing around each of the sets of two wheels on opposite sides of the platform, said platform having a depression extending across the same midway between the front and rear wheels to form a seat for the rear axle of an automobile and having openings at the ends of said depression to permit the rear driving wheels on an automibile axle resting in said depression to project downwardly, one wheel of each set having on the inner side thereof a sprocket wheel.

3. In a device of the character described, an approximately square platform having four supporting wheels arranged two on each side thereof, an endless track passing around the wheels on each side of the platform, said platform having a central transverse depression adapted to serve as a seat for the rear axle of an automobile and having at the ends of said depression openings through which the rear driving wheels may extend when the axle is seated in said depression.

In testimony whereof, I sign this specification.

MAX L. SCHLUETER.